US008214909B2

(12) United States Patent
Morita et al.

(10) Patent No.: US 8,214,909 B2
(45) Date of Patent: Jul. 3, 2012

(54) INFORMATION DISPLAY DEVICE

(75) Inventors: Masanori Morita, Fussa (JP); Atsushi Narusawa, Hino (JP); Nobutake Ishii, Tama (JP); Mamoru Sakai, Kawasaki (JP)

(73) Assignee: Seiko Epson Corporation (JP)

( * ) Notice: Subject to any disclaimer, the term of this patent is extended or adjusted under 35 U.S.C. 154(b) by 1026 days.

(21) Appl. No.: 11/585,386

(22) Filed: Oct. 24, 2006

(65) Prior Publication Data

US 2007/0094742 A1    Apr. 26, 2007

(30) Foreign Application Priority Data

Oct. 25, 2005  (JP) .................................. 2005-309451

(51) Int. Cl.
*G06F 17/30* (2006.01)
(52) U.S. Cl. ................................ 726/26; 726/27; 726/2
(58) Field of Classification Search .................. 726/26
See application file for complete search history.

(56) References Cited

U.S. PATENT DOCUMENTS

| 5,396,443 | A  | * | 3/1995  | Mese et al. ................ 713/321 |
| 7,379,917 | B2 | * | 5/2008  | Yoshida et al. ............... 705/52 |
| 8,103,881 | B2 | * | 1/2012  | Doughty et al. ............. 713/186 |
| 2001/0028366 | A1 | * | 10/2001 | Ohki et al. ................... 345/772 |
| 2003/0184589 | A1 | * | 10/2003 | Yamada et al. .............. 345/781 |
| 2004/0117445 | A9 | * | 6/2004  | Lee et al. ..................... 709/205 |
| 2005/0192063 | A1 | * | 9/2005  | Brubacher-Cressman et al. ............................. 455/574 |
| 2006/0059462 | A1 | * | 3/2006  | Yamamoto ................... 717/115 |
| 2006/0059544 | A1 | * | 3/2006  | Guthrie et al. .................. 726/4 |
| 2006/0092453 | A1 | * | 5/2006  | Okada et al. ................ 358/1.14 |
| 2007/0027809 | A1 | * | 2/2007  | Alve ............................... 705/51 |
| 2008/0148059 | A1 | * | 6/2008  | Shapiro ....................... 713/186 |

FOREIGN PATENT DOCUMENTS

| JP | 2002-027159  |   | 1/2002  |
| JP | 2005275943 A | * | 10/2005 |
| JP | 2004-316308  | * | 11/2005 |
| JP | 2005321977 A | * | 11/2005 |

OTHER PUBLICATIONS

Shim et al., "Power Saving in Hand-held Multimedia Systems Using MPEG-21 Digital Item Adaptation," IEEE, 2004, pp. 13-18.*
Shih et al., "Wake on Wireless: An Event Driven Energy Saving Strategy for Battery Operated Device," ACM, 2002, pp. 160-171.*
Kimmel et al., "Display Technologies for Portable Communication Devices," IEEE, Apr. 2002, pp. 581-589.*

* cited by examiner

*Primary Examiner* — Luu Pham
(74) *Attorney, Agent, or Firm* — Harness, Dickey & Pierce, P.L.C.

(57) ABSTRACT

An information display device for displaying prescribed information on a prescribed display body, includes: an authentication operation request section for allowing a user to make user authentication; and an operation permission section for accepting an operation on said information display device for a prescribed permission time since said information display device is lastly operated, if the user who makes the authentication operation is authorized to perform the operation of said information display device; wherein said operation permission section sets said permission time based on the display contents on said display body.

6 Claims, 4 Drawing Sheets

INFORMATION DISPLAY DEVICE

The entire disclosure of Japanese Application No. 2005-309451, filed Oct. 25, 2005, is expressly incorporated by reference herein.

BACKGROUND

1. Technical Field

The present invention relates to an information display device that displays prescribed information on a prescribed display body.

2. Description of the Related Art

Conventionally, as a technique of this kind, for example, there is an information display device that switches and displays the pages of the contents on a memorable display body capable of holding the display contents even if the power supply is stopped. In such an information display device, electric power may be supplied only when the display contents are switched to reduce the power consumption and power supply may be stopped after the end of switching.

Also, for example, there is an authentication unit that is mounted on any device to make the user authentication, and permits the operation only if the authentication is successful. In such an authentication unit, generally, if power supply is stopped, the authentication result is discarded, and when power is supplied, an operation of re-authentication is required.

If the authentication unit is mounted on the conventional information display device, the re-authentication operation is required every time the display contents are switched, whereby there is a fear that it is troublesome for the user.

Therefore, in an apparatus such as a copy machine or FAX that stops the power supply immediately after the end of operation, for example, there is a technique that the stop of power supply to the authentication unit is postponed for a certain period after the end of operation, whereby the re-authentication operation is not required for that period (e.g., refer to JP-A-2002-27159).

SUMMARY

However, if the above conventional technique is applied to an information display device, from the viewpoints of reducing the power consumption and improving the security, the certain period until the power supply is stopped is set to a shorter time. But if the information amount of the switched and displayed page is large, for example, the certain period passes in the midst of perusing the display content, the power supply to the authentication unit is stopped, and the authentication result is discarded, so that the power supply is resumed and the re-authentication operation is required, every time the next page is displayed in turn after perusal of each page, whereby there is a fear that it is troublesome for the user.

The invention has been achieved to solve the above-mentioned problems associated with the prior art, and it is an object of the invention to provide an information display device that can relieve the trouble of the user authentication.

In order to accomplish the above object, the invention provides an information display device for displaying prescribed information on a prescribed display body, comprising an authentication operation request section for allowing a user to make user authentication, and an operation permission section for accepting an operation on the information display device for a prescribed permission time since the information display device is lastly operated, if the user who makes the authentication operation is authorized to perform the operation of the information display device, wherein the operation permission section sets the permission time based on the display contents on the display body.

Also, the information display device of the invention may further comprise an image data generation section for generating image data based on a group of elements associated in advance with a predicted time required for perusal, and a display body drive section for driving the display body to display the image data thereon, wherein the operation permission section sets the permission time based on the associated predicted time of the group of elements used to generate the image data.

Moreover, the information display device of the invention may further comprise a permission time correction section for correcting the permission time set up by the operation permission section, based on the character size, the display language and the kind of contents for the group of elements used to set up the permission time.

Also, the information display device of the invention may further comprise a display body drive section for driving the display body to display the image data associated in advance with the predicted time required for perusal thereon, wherein the operation permission section makes the predicted time corresponding to the image data the permission time.

With this configuration, when the page having a large amount of information is displayed in which it takes a lot of time for the user to end the perusal, the permission time is set to be longer, so that it is possible to prevent a state where the operation is not accepted before the user ends the perusal, and prevent the re-authentication operation from being requested when plural pages are perused successively, thereby relieving the trouble of the user authentication.

Also, if the page having a small amount of information is displayed in which the user ends the perusal soon, the permission time is set to be shorter, so that when the information display device is left, it can be put soon in a state where the re-authentication is required, improving the security.

Further, the information display device may further comprise a storage section that discards storage contents if power supply is stopped, and a user determination section for determining whether or not the user who makes the authentication operation is authorized to perform the operation of the information display device and storing the determination result in the storage section, wherein the operation permission section accepts an operation on the information display device for only a prescribed permission time since the information display device is lastly operated and stops the power supply to the storage section after the elapse of the permission time, if the determination result indicating that the user is authorized to perform the operation is stored in the storage section.

With this configuration, when the information display device is left, the power supply to the storage section can be stopped at earlier timing, so that the power consumption of the information display device can be reduced.

Also, the display body may be a memorable display body capable of holding the display contents even if the power supply is stopped, and the information display device may further comprise a power supply stop section for stopping the power supply to the memorable display body and a drive section of the memorable display body for the permission time since the information display device is lastly operated.

With this configuration, the power supply to the memorable display body can be stopped at earlier timing, so that the power consumption of the information display device can be reduced.

DETAILED DESCRIPTION OF THE PREFERRED EMBODIMENTS

The preferred embodiments of the present invention in which an information display device is applied to an electronic book reader capable of displaying a plurality of contents partitioned into plural pages will be described below with reference to the drawings.

Configuration of Information Display Device

Figure 1:
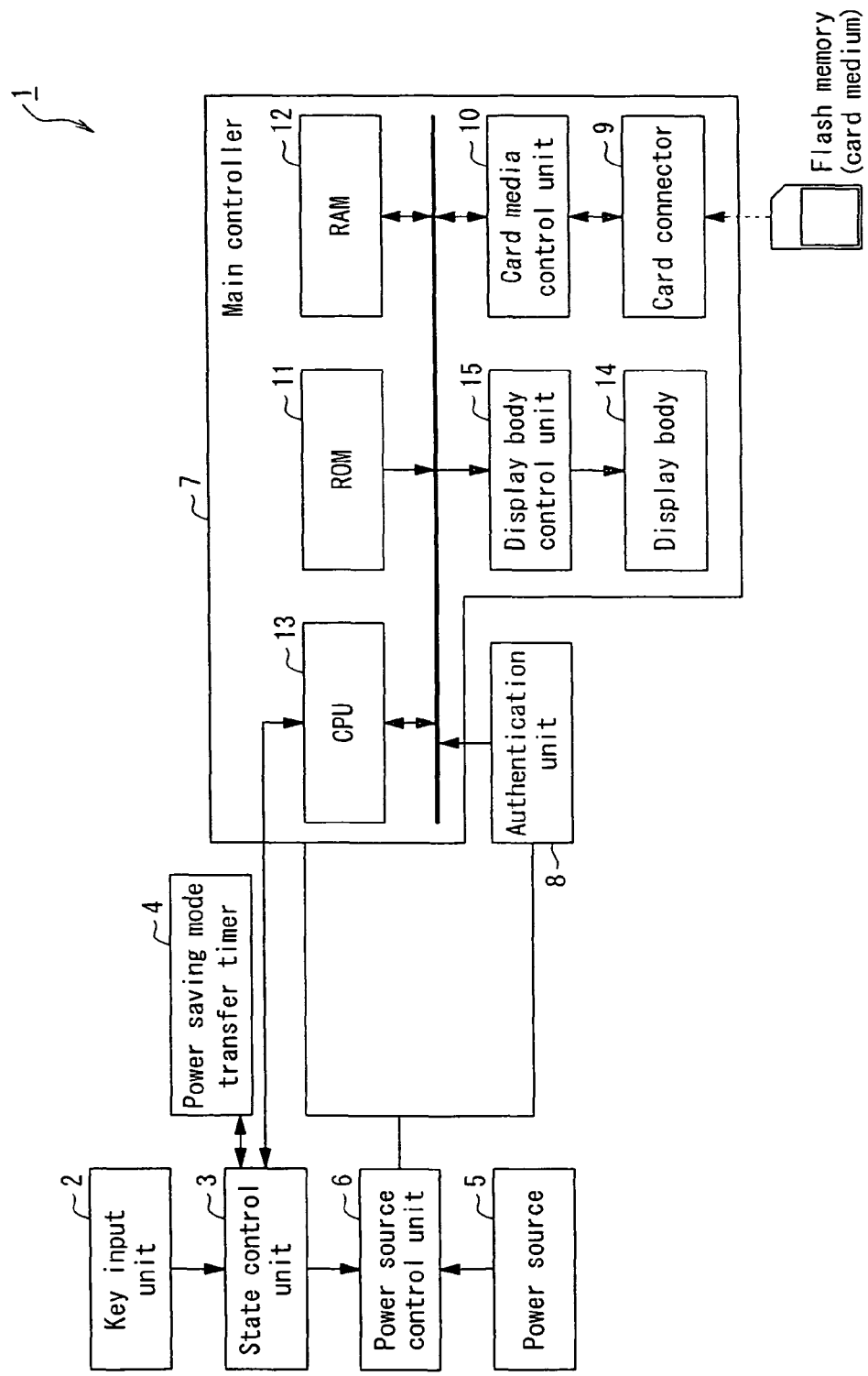
FIG. 1 is a block diagram showing the internal configuration of an information display device.

FIG. 1 is a block diagram showing the internal configuration of the information display device according to an embodiment of the invention. This electronic book reader 1 comprises a key input unit 2, a state control unit 3, a power saving mode transfer timer 4, a power source 5, a power source control unit 6, a main controller 7 and an authentication unit 8.

The key input unit 2 has a plurality of keys for making various kinds of operations on the electronic book reader 1. And the key input unit 2 outputs a key input signal indicating the manipulated key if the key is manipulated.

The state control unit 3 outputs a command (power supply start command) of starting the power supply to the main controller 7 and the authentication unit 8 to the power source control unit 6 if the key input signal is outputted from the key input unit 2.

Also, the state control unit 3 outputs a command (first power supply end command) of ending the power supply to the main controller 7, and outputs a command (count start command) of starting to count the time elapsed from the end of the power supply to the power saving mode transfer timer 4, if a certain time (for example, 5 seconds, longer than the time taken until the page contents data is rendered on the display body 14 in accordance with the key input signal, to prevent the power supply to the main controller 7 from being stopped every time of the key operation and prevent the operation response from being slower due to the start process of the main controller 7 when consecutive key operations are made) passes since the key input signal is outputted from the key input unit 2.

Moreover, the state control unit 3 outputs a command (reset command) of resetting the count value to the power saving mode transfer timer, if a key input signal is outputted from the key input unit 2 while the power saving mode transfer timer 4 counts.

Also, the state control unit 3 outputs a command (second power supply end command) of ending the power supply to the authentication unit 8 to the power source control unit 6, when the power saving mode transfer time (as will be described later) set up based on the display contents is counted by the power saving mode transfer timer 4.

Moreover, the state control unit 3 transfers the key input signal outputted from the key input unit 2 to a CPU 13 (as will be described later) of the main controller 7.

The power saving mode transfer timer 4 starts to count the time elapsed, if a count start command is outputted from the state control unit 3.

Also, the power saving mode transfer timer 4 resets the count value, if a reset command is outputted from the state control unit 3 while counting the time elapsed.

The power source 5 is a secondary battery accumulating the electric power obtained from the outside to supply power to each of the units 2 to 10 in the electronic book reader 1.

The power source control unit 6 starts to supply power to the main controller 7 and the authentication unit 8, if a power supply start command is outputted from the state control unit 3.

Also, the power source control unit 6 ends the power supply to the main controller 7, if a first power supply end command is outputted from the state control unit 3.

Moreover, the power source control unit 6 ends the power supply to the authentication unit 8, if a second power supply end command is outputted from the state control unit 3.

The main controller 7 comprises a card connector 9, a card media control unit 10, a ROM 11, a RAM 12, the CPU 13, a display body 14 and a display body control unit 15.

The card connector 9 is allowed to insert a card medium storing the data of contents (contents data) to be displayed.

Figure 2:
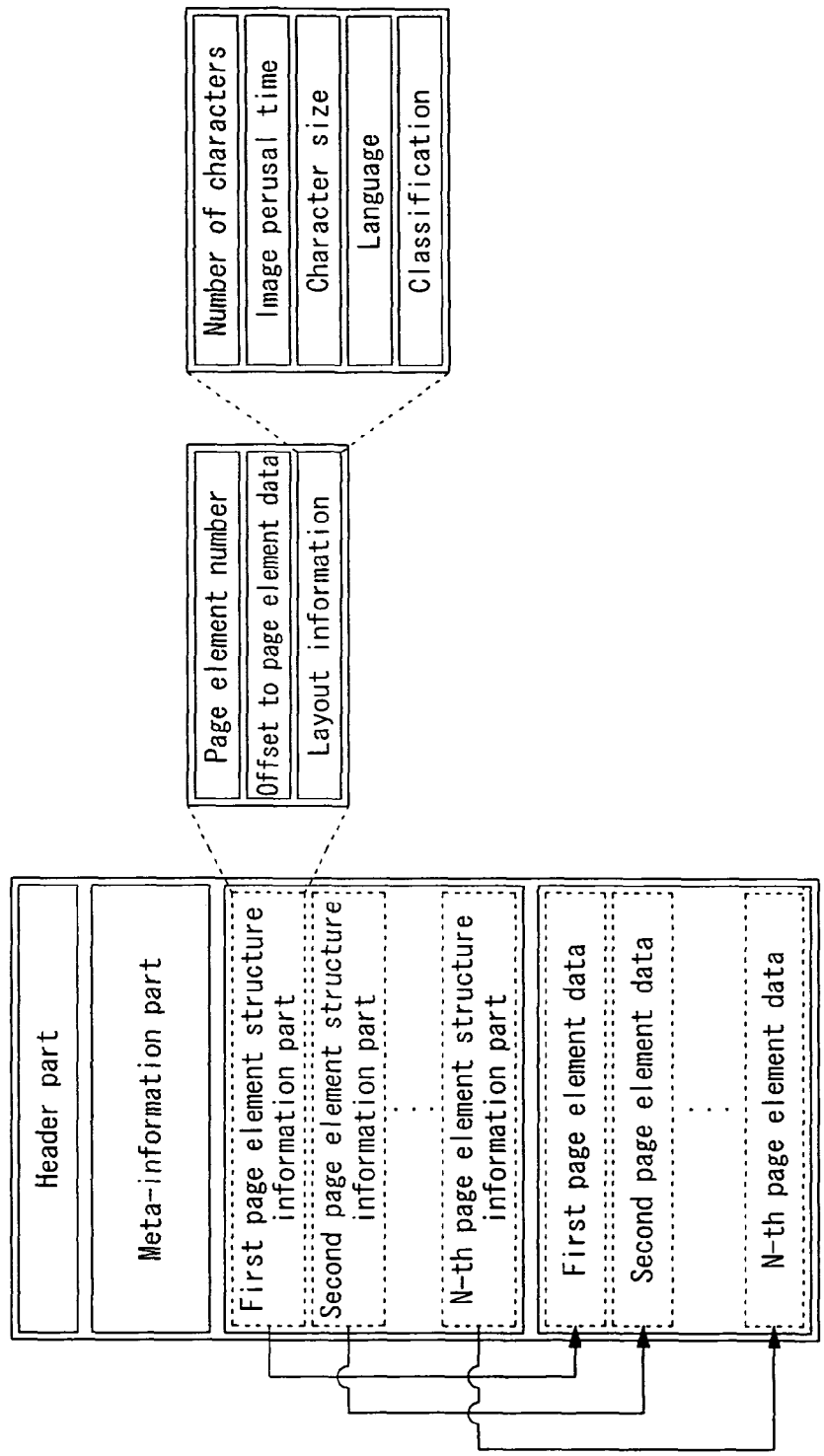
FIG. 2 is an explanatory view for explaining the contents data.

Herein, the contents data is composed of a header part, a meta-information part, first to N-th page element structure information parts and first to N-th page element data, as shown in FIG. 2.

The header part is an area for storing the information (file size, file name) of the file organization of the contents data.

The meta-information part is an area for storing the attribute information (name of contents, author, number of pages) of the corresponding contents.

Each of the first to N-th page element structure information parts is an area for storing the attribute information of each of the first to N-th pages (N is the last page number of the corresponding contents) of the corresponding contents. More specifically, it stores the page number of corresponding page, an offset to the page element data, and layout information (number of characters, image perusal time, character size, language and classification).

The first to N-th page element data is an area for storing the page constituent element such as character (composition) or image (illustration) at each of the first to N-th pages of the corresponding contents.

The card media control unit 10 reads the contents data corresponding to a data read-out command (command of reading out the contents data) outputted from the CPU 13 from a card medium inserted into the card connector 9.

The ROM 11 stores various programs such as a basic control program and an application program executed by the CPU 13 and the data concerning those programs.

The RAM 12 forms a memory area for storing the data concerning various kinds of process performed by the CPU 13, as well as a work area where various kinds of programs are developed.

The CPU 13 controls each unit of the electronic book reader 1 by reading various kinds of programs and data stored in the ROM 11, and executing various kinds of programs.

More specifically, when any contents (page) are selected as the display object, the CPU 13 outputs a data read-out command of reading out the contents data of the contents from the card medium inserted into the card connector 9 to the card media control unit 10, if the authentication information indicating the "authorized state" is stored in the authentication unit 8.

Also, the CPU 13 sets up the layout of the display page based on the contents data read out from the card medium, and generates the page contents data of the display page (image data displayed on the display body 14) according to the layout.

Moreover, the CPU 13 calculates the time (power saving mode transfer time) since the power supply to the main controller 7 is ended until the power supply to the authentication unit 8 is ended according to the set-up layout (display contents), and outputs the calculation result to the state control unit 3.

More specifically, the power saving mode transfer time is calculated based on the page constituent elements such as the character or image contained in the laid out display page. For example, supposing that 10 characters per second can be read, and the image can be perused in a predetermined time when the contents data is generated, the power saving mode transfer time is calculated in accordance with the formula "number of characters×0.1 sec.+sum of predetermined time for each image".

Next, the calculation result is corrected based on the additional information such as character size, language and classification. For example, the power saving mode transfer time is corrected to be longer as the character size is smaller, because the small character is difficult to read. Also, since it takes a long time to read the document in non-native language, the power saving mode transfer time is corrected to be longer if the document is described in a foreign language. Further, since the special document such as a treatise is more difficult to read than the general document such as a novel, the power saving mode transfer time is corrected to be longer in the special book.

The display body 14 is a memorable display body capable of holding the display contents even if the power supply is stopped.

The display body control unit 15 drives the display body 14 and renders the page contents data generated by the CPU 13 on the display body 14.

The authentication unit 8 prompts the user to perform an authentication operation and detects the authentication operation if the power supply is started. And the authentication unit 8 determines whether or not the user is authorized to operate the electronic book reader 1 based on its detection result. If it is determined that the user is authorized, the authentication information indicating the "authorized state" is stored. The authentication information is discarded if the power supply to the authentication unit 8 is ended.

Specific Operation of Information Display Device

Figure 3:
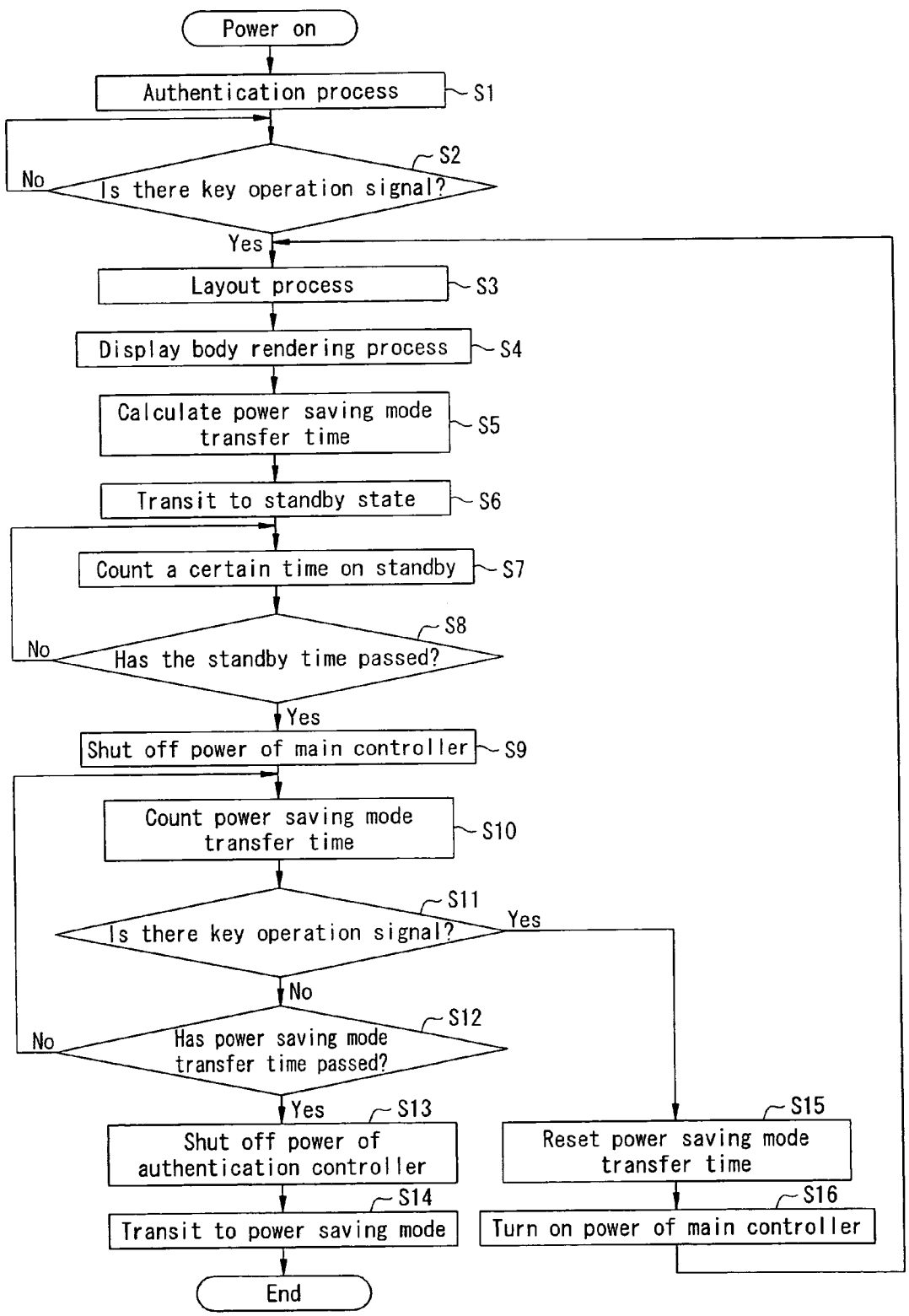
FIG. 3 is a flowchart showing the operation of the information display device.

First of all, it is supposed that the authorized user performs the authentication operation. Then, the authentication unit 8 performs the authentication process, whereby the authentication information of "authorized state" is stored (step S1 of FIG. 3).

Also, it is supposed that the user manipulates the key input unit 2, and selects any contents as the display object. Then, the CPU 13 confirms that the authentication information of the "authorized state" is stored in the authentication unit 8, a data read-out command is outputted to the card media control unit 10. The card media control unit 10 reads out the contents data of the selected contents from the card medium inserted into the card connector 9. Also, the CPU 13 sets up a layout of the display page based on the read contents data, and generates the page contents data of the display page according to the layout (steps S2 and S3). And the display body control unit 15 renders the generated page contents data on the display body 14 (step S4).

Simultaneously, the CPU 13 calculates the power saving mode transfer time according to the set-up layout (step S5), and outputs its calculation result to the state control unit 3.

More specifically, it is supposed that the display page contains 1000 characters, two images are provided, and the predetermined time for perusing the image is 5 seconds. Then, the power saving mode transfer time is calculated as 110 (="1000×0.1+2×5") seconds.

Also, it is supposed that the character size is 8 points, the language is English, and the classification is thesis (normally the character size is 10 points and the native language is Japanese). And supposing that a difference between the time taken to read the characters written in 10 points and the time taken to read the characters written in 8 points is 5%, a difference between the time taken for the person with the native language of Japanese to read the document written in Japanese and the time taken to read the document written in English is 10%, and a difference between the time taken to read the general document and the time taken to read the special document is 15%, the correction value is 31.5 (=105×(0.10+0.05+0.15)) seconds, so that the power saving mode transfer time is 136.5 (=105+31.5) seconds.

And the state control unit 3 is put in a standby state of five seconds after the end of rendering (steps S6 to S8), and outputs a first power supply end command to the power source control unit 6, and the power source control unit 6 ends the power supply to the main controller 7 (step S9). Also, the state control unit 3 outputs a count start command to the power saving mode transfer timer 4, and the power saving mode transfer timer 4 starts to count the time elapsed (step S10).

Also, it is supposed that the user manipulates the key input unit 2 while counting the transfer time. Then, the key input unit 2 outputs a key input signal to the state control unit 3, the state control unit 3 outputs a reset command to the power saving mode transfer timer 4, and the power saving mode transfer timer 4 resets the count value (step S11 "Yes", S15). The state control unit 3 outputs a power supply start command to the power source control unit 6 and the power source control unit 6 starts to supply power to the main controller 7 (step S16). And the above flow from step S3 is repeated.

Herein, it is supposed that the user leaves the electronic book reader 1, and the power saving mode transfer timer 4 counts the power saving mode transfer time (136.5 seconds). Then, the state control unit 3 outputs a second power supply end command to the power source control unit 6, and the power source control unit 6 ends the power supply to the authentication unit 8 (step S13). The authentication information stored in the authentication unit 8 is discarded, and the operation transfers to a power saving mode (step S14).

In this manner, in the electronic book reader 1 of this embodiment, the power saving mode transfer time is set up based on the page element data used to generate the image data of the display page. Therefore, when the page having a large amount of information is displayed in which it takes a long time to end the perusal, the power saving mode transfer time can be set to be longer. Hence, it is possible to prevent a state where the operation is not accepted before the user ends the perusal, and prevent the re-authentication operation from being requested when plural pages are perused successively, thereby relieving the trouble of the user authentication.

Also, when the page having a small amount of information is displayed in which the perusal is ended soon, the power saving mode transfer time can be set up to be shorter. As a result, when the electronic book reader 1 is left, the operation can be put soon in a state where the re-authentication is required, thereby improving the security.

Moreover, when a predetermined certain time passes since the key input signal is outputted, the power supply to the main controller 7 is stopped, whereby the power supply to the main controller 7 can be stopped at earlier timing, reducing the power consumption of the electronic book reader 1.

As described above, in the above embodiment, the authentication unit 8 of FIG. 1 constitutes an authentication operation request section as defined in the claims. Also, the state control unit 3, the power source control unit 6 and the CPU 13 of FIG. 1, and the steps S1 to S16 of FIG. 3 constitute an operation permission section; the CPU 13 of FIG. 1 and the step S3 of FIG. 3 constitute an image data generation section; the CPU 13 and the display body control unit 15 of FIG. 1, and the step S4 of FIG. 3 constitute a display body drive section; the CPU 13 and the display body control unit 15 of FIG. 1, and the step S5 of FIG. 3 constitute a permission time correction section; the display body 14 of FIG. 1 constitutes a memorable display body; the authentication unit 8 of FIG. 1 constitutes a storage section; and the CPU 13 of FIG. 1 and the step S1 of FIG. 3 constitute a user determination section.

The information display device unit of the invention is not limited to the substance of the above embodiment, but various modifications may be made without departing from the spirit or scope of the invention.

In the above embodiment, supposing that the image can be perused in a predetermined time, the power saving mode transfer time is setup, but the invention is not limited thereto. For example, as the size of image is larger, it takes a longer time to peruse the image, whereby the power saving mode transfer time may be set up by calculating the time required to peruse the image based on the size of image (width×height).

Also, the power saving mode transfer time may be set up, using a difference between the calculation result of the power saving mode transfer time and the time required for the user to actually peruse the display page. More specifically, when the calculation result of the power saving mode transfer time is 136.5 seconds, and the time taken for actual perusal is 135 seconds, namely, there is a difference of −1.5 seconds, the power saving mode transfer time to be calculated next is corrected by subtracting 1.5 seconds. Also, the time difference may be detected every time the power saving mode transfer time is calculated, and the average value of detection results may be used instead of the difference. Further, when the average value of time differences is used, the user may be specified by the authentication unit 8, and the average value may be managed for every user.

Moreover, a sample document may be firstly displayed to detect the time required for the user to peruse the display page. More specifically, when the user operates the electronic book reader 1 for the first time, or when the initialization operation is performed, a sample document of several pages is displayed, and at the time when the perusal is ended, the user makes a key manipulation to associate the document amount of the sample document with the time taken for perusal. And the perusal time is estimated by comparing the document amount of the display page and the document amount of the sample document, and set to the power saving mode transfer time. Also, the power saving mode transfer time may be corrected using a difference between the power saving mode transfer time obtained from the formula of the above embodiment and the perusal time obtained by comparison with the document amount of the sample document as the correction value.

Figure 4:
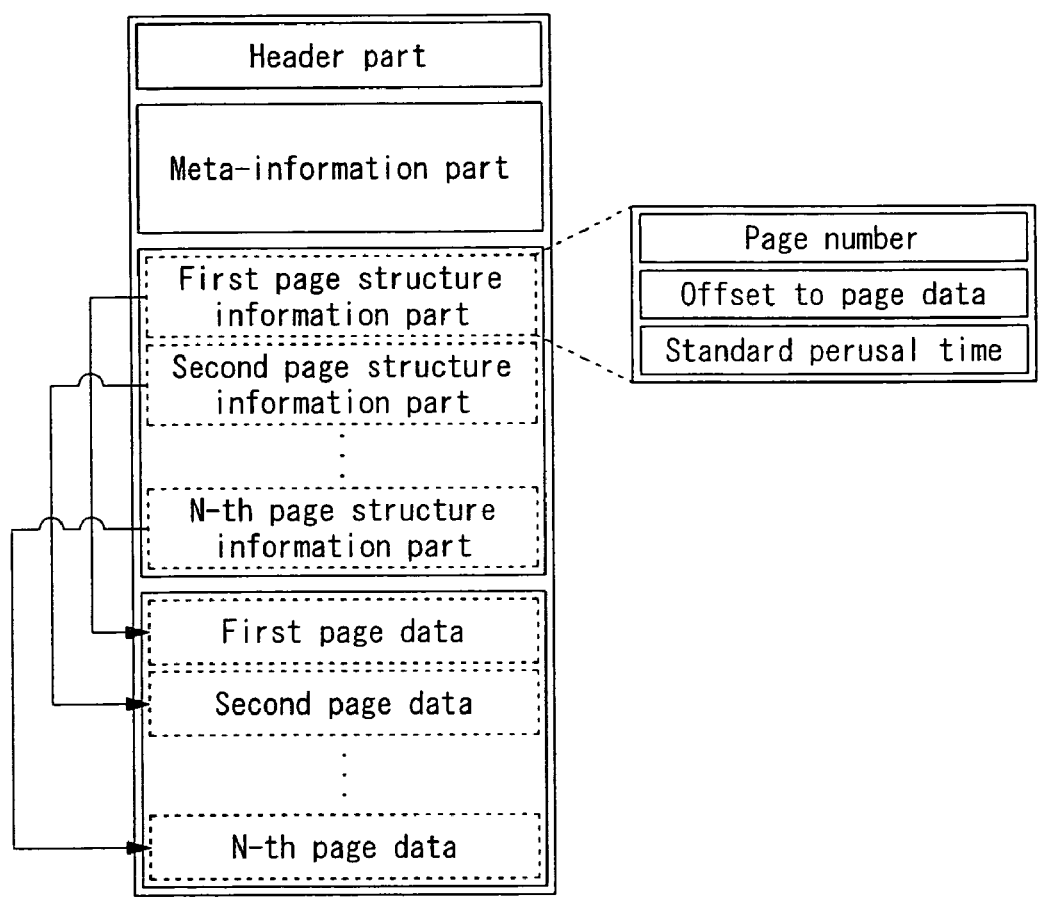
FIG. 4 is an explanatory view for explaining a modification of the invention.

Also, in the above embodiment, a layout of the display page is set up based on the contents data (the first to N-th page element data, the first to N-th page element structure information part), and the power saving mode transfer time is calculated according to the layout, but the invention is not limited thereto. For example, the standard perusal time of the display page may be set to the power saving mode transfer time by providing the first to N-th page data (an area for storing the display contents of each of the first to N-th pages of the corresponding contents as one image data), instead of the first to N-th page element data of the contents data, and providing the first to N-th page structure information parts (area for storing the page number of the corresponding page, offset to the page data, standard perusal time (standard time taken to peruse the corresponding page, and decided by the contents of the page or the amount of composition)), instead of the first to N-th page element structure information parts, as shown in FIG. 4.

Moreover, when the first to N-th page data is stored in the contents data, the power saving mode transfer time may be set up or corrected based on a compression ratio of the image data. More specifically, when each page of the contents is stored as the laid out image, and the image data of the image is compressed, the power saving mode transfer time may be set up based on its compression ratio. For example, when the document amount is small (large), the compression ratio is high (low), whereby the document amount is estimated according to its compression ratio, and the perusal time is estimated and set to the power saving mode transfer time. Also, the power saving mode transfer time may be corrected using a difference between the power saving mode transfer time obtained from the formula of the above embodiment and the perusal time obtained based on the compression ratio as the correction value.

Also, the importance of each of the first to N-th page structure information parts may be stored, in which when the importance of the display page is high, the power supply to the authentication unit 8 is ended at the same time when the power supply to the main controller 7 is ended, whereby the authentication information is discarded and the security is increased.

What is claimed is:

1. An ebook reader comprising:
a key input device;
a main controller with a Central Processing Unit (CPU);
a storage unit;
a power source;
a timer;
a memorable display body configured to maintain display of contents displayed after a power supply from the power source has been interrupted;
an authentication circuitry configured to prompt a user to perform an authentication operation upon the power supply from the power source being started and to determine whether the user is authorized to view the contents displayed on the memorable display body;
a power supply controller configured to output a first instruction to the power supply controller when a predetermined amount of time lapses from when an input is last received by the key input device, to output a second instruction to the power supply controller when a power saving mode transition time period lapses from when the first instruction is output, and to output a reset instruction to the timer when a new input received from the key input device is received before the power saving mode transition time period has lapsed;
an operation permission unit accepting an input to the ebook reader when the user who makes an authentication operation to the ebook reader is authorized;
wherein the CPU calculates the power saving mode transition time period based on the contents displayed by the memorable display body,
wherein the timer starts a counter indicating an amount of time that has lapsed since the state controller outputted the first instruction in response to a count start instruction outputted by the state controller, resets the counter when the reset instruction is outputted by the state controller, and counts the amount of time until the counter equals the power saving mode transition time period when the reset instruction is not outputted from the state controller;

when the counter counts up to the power saving mode transition time period, the state controller outputs the second instruction to the power supply controller and the power supply controller interrupts the power supply to the authentication circuitry, and when the timer is reset, the CPU calculates a new power saving mode transition time based on a difference between the power saving mode transition time and an amount of time indicated by the counter; and wherein when the authentication circuitry initially recognizes the user, a sample document is displayed and the user is prompted to provide an input to the key input after viewing the sample document, wherein the new power saving mode transition time period is calculated based on the amount of time from when the sample document was displayed until the user provides the input to the key input and further based on an amount of contents in the sample document.

2. The ebook reader according to claim 1, further comprising an image data generation unit for generating image data based on the group of elements associated in advance with a predicted time required for perusal, and a display body drive unit for driving said display body to display the image data thereon, wherein said operation permission unit sets a permission time based on an associated predicted time of the group of elements used to generate said image data.

3. The ebook reader according to claim 2, further comprising a display body drive unit for driving said display body to display the image data associated in advance with the predicted time required for perusal thereon, wherein said operation permission unit makes the predicted time corresponding to said image data of said permission time.

4. The ebook reader according to claim 1, wherein the storage unit discards storage contents if power supply is stopped, and the operation permission unit determining whether or not the user who makes said authentication operation is authorized to perform the operation of said ebook reader and storing the determination result in said storage unit, wherein said operation permission unit accepts an operation on ebook reader for only the prescribed permission time since said ebook reader is lastly operated and stops the power supply to said storage unit after the elapse of said permission time, if the determination result indicating that the user is authorized to perform said operation is stored in said storage unit.

5. The ebook reader device according to claim 1, wherein said display body is a memorable display body capable of holding the display contents even if the power supply is stopped, and said ebook reader further comprising a power supply stop unit for stopping the power supply to said memorable display body and a drive unit of said memorable display body for said permission time since said ebook reader is lastly operated.

6. The ebook reader of claim 1, wherein each time the new power saving mode transition time period is calculated, the difference between the calculated power saving mode transition time period and an amount of time taken for the user to view the contents is calculated, and a mean value of the calculated result is used instead of the difference.

* * * * *